United States Patent

[11] 3,604,479

| [72] | Inventor | Bertram L. Jordan<br>Lewiston, N.C. |
|---|---|---|
| [21] | Appl. No. | 819,237 |
| [22] | Filed | Apr. 25, 1969 |
| [45] | Patented | Sept. 14, 1971 |
| [73] | Assignee | Harrington Manufacturing Company, Inc. |

[54] CHAIN SAW TREE-FELLING APPARATUS
1 Claim, 10 Drawing Figs.

[52] U.S. Cl. ........................................ 143/32, 144/34
[51] Int. Cl. .................................... B27b 17/02, A01g 23/08
[50] Field of Search ......................... 143/32, 43; 144/34, 3, 309

[56] References Cited
UNITED STATES PATENTS

| 3,074,447 | 1/1963 | Bombardier.................. | 143/32 X |
| 3,140,736 | 7/1964 | Propst.......................... | 144/34 X |

FOREIGN PATENTS

| 142,106 | 3/1961 | U.S.S.R. ...................... | 143/32 |

Primary Examiner—Donald R. Schran
Attorney—Fred C. Philpitt

ABSTRACT: The present invention pertains to a tree-felling device that is adapted to be mounted on the front of a vehicle and that incorporates a pivotally mounted chain saw. The chain saw is associated with means for assisting the directional felling of the tree.

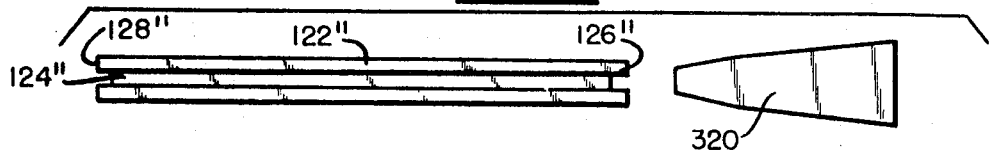
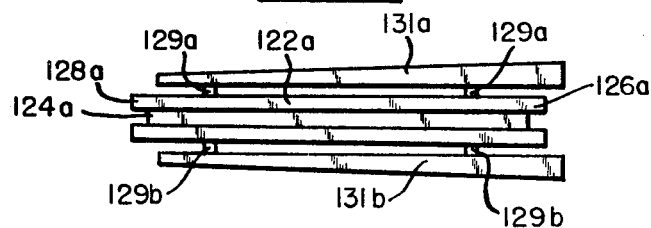
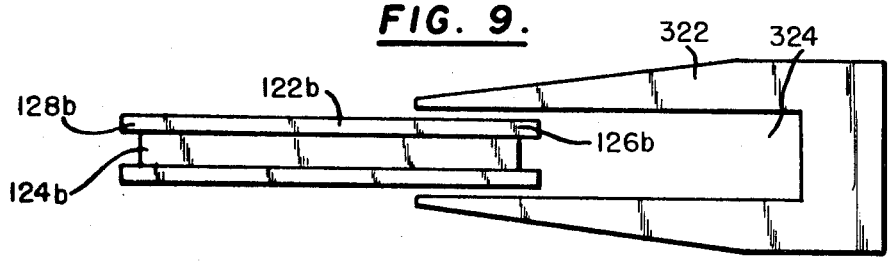
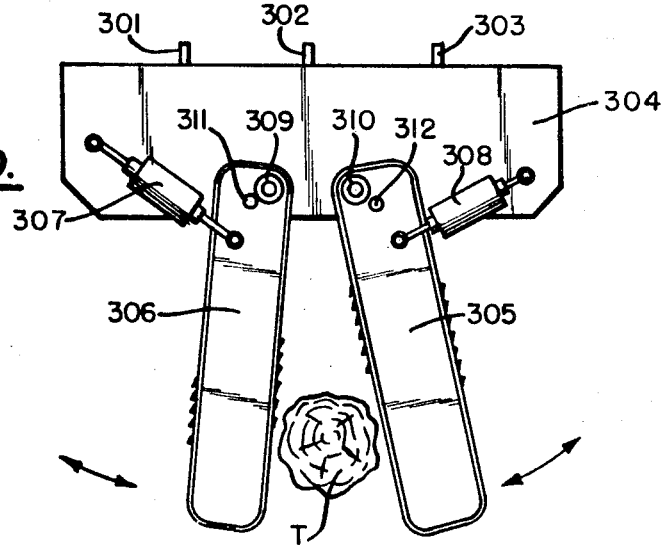

CHAIN SAW TREE-FELLING APPARATUS

BACKGROUND OF THE INVENTION

The present invention relates to a device for felling trees which is adapted to be mounted on a vehicle such as a tractor or skidder, and operated by hydraulic power means and which enables a single operator to perform the work of many men using individual saws or other tree felling devices.

A number of tree felling devices have been developed, and the most common type of apparatus now in wide use comprises a knifelike shear blade which is moved through an arc by hydraulic power means and is adapted to shear off a tree between the shear blade and a fixed jaw. Such a shear is shown, for example in U.S. Pat. No. 3,327,745.

This type of tree cutter device may be successfully employed in harvesting pulpwood from trees having a diameter up to 28 to 30 inches and also in harvesting hardwood of relatively small diameter. These known devices have certain drawbacks and limitations when harvesting large diameter pulpwood or medium size hardwood. A particular drawback is the fact that some tree shears cause occasional "splitting" of the tree trunk as the shear nears the end of its normal stroke. Trees which have been undesirably split provide a lower overall yield of lumber from the tree. Additionally, the split portion that often remains on the stump is quite undesirable. Examples of patents relating to various tree shear devices would include:

U.S. Pat. Nos. 2,214,334; 2,228,635; 2,493,696; 2,529,934; 2,565,252; 2,697,459; 2,751,943; 2,820,493; 2,845,101; 2,876,816; 2,955,631; 2,981,301; 3,059,677; 3,122,184; 3,183,949; 3,183,952; 3,183,953; 3,183,954; 3,196,726; 3,196,911; 3,230,988.

A further problem encountered when utilizing some tree-felling devices which incorporate a chain saw is the fact that the direction in which the tree is felled can not always be accurately controlled. The direction of felling is often an important consideration and, accordingly, it is desirable to provide a means for readily directing a tree in the proper direction when it is felled. Examples of some of the prior art chain saws of which applicant is aware and which are incorporated herein by reference to illustrate what is known in the prior art include:

U.S. Pat. Nos. 1,642,668; 2,051,195; 2,636,524; 2,698,035; 2,733,738; 2,749,707; 2,764,870; 2,815,048; 2,882,941; 3,043,079; 3,074,447; 3,078,886; 3,237,388; 3,238,981; 3,323,563; 3,340,912; 3,343,575; 3,348,592; 3,350,770; 3,364,964.

THE INVENTION

Considered from one aspect, the tree-felling apparatus of the present invention includes:
a. an endless saw chain,
b. a saw bar member disposed within the periphery of said endless chain and functioning as the main supporting member for said chain,
c. a trackway for said endless saw chain disposed around the periphery of said saw bar member,
d. means for intermittently driving said chain around said trackway,
e. said saw bar member being pivotally mounted upon a support member that is in turn adapted to be connected to a wheeled vehicle,
f. said support member including a jaw member,
g. means for moving said saw bar member through a limited arc about its pivotal mounting so that said bar member can move toward and away from said jaw member,
h. said saw bar member having a leading edge and a trailing edge, the leading edge being disposed closest to said jaw member and the trailing edge being disposed directly rearwardly of said leading edge,
i. the cross-sectional configuration of said saw bar member and any parts joined thereto in the area between said leading edge and said trailing edge being at least partially wedge-shaped,
j. whereby, as said saw chain cuts into the trunk of a tree, and the saw bar member follows into the cut so made, the wedge-shaped cross-sectional configuration of said saw bar member will assist in the directional felling of the tree.

As is well known, there is a tendency for a tree being cut to pinch a chain saw thereby hindering proper operation of the saw. In the present invention, the tapered cross section of the saw bar serves the dual function of applying a force to a tree which causes it to be felled in a desired direction, and further which prevents the chain saw from being pinched by the tree during a cutting operation. This enables the chain saw means to operate in the most efficient manner and further enables the direction of felling of a tree to be very accurately controlled by an operator of the apparatus.

BRIEF DESCRIPTION OF THE DRAWINGS

FIG. 6 is an end view of the saw bar of another embodiment of the invention.

FIG. 7 is an end view of the saw bar of still another embodiment of the invention, which additionally shows a following wedge member.

FIG. 8 is an end view of the saw bar of still another embodiment of the invention wherein the saw bar of still another embodiment of the invention wherein the saw bar member has separate wedge members attached thereto.

FIG. 9 is an end view of a saw bar of still another embodiment of the invention which includes a following wedge-shaped member that can move into an enclosing relationship with the trailing edge of the saw bar member.

FIG. 10 is a schematic plan view of still another embodiment of the invention employing cooperating chain saws.

DESCRIPTION OF THE PREFERRED EMBODIMENT

Figure 1:
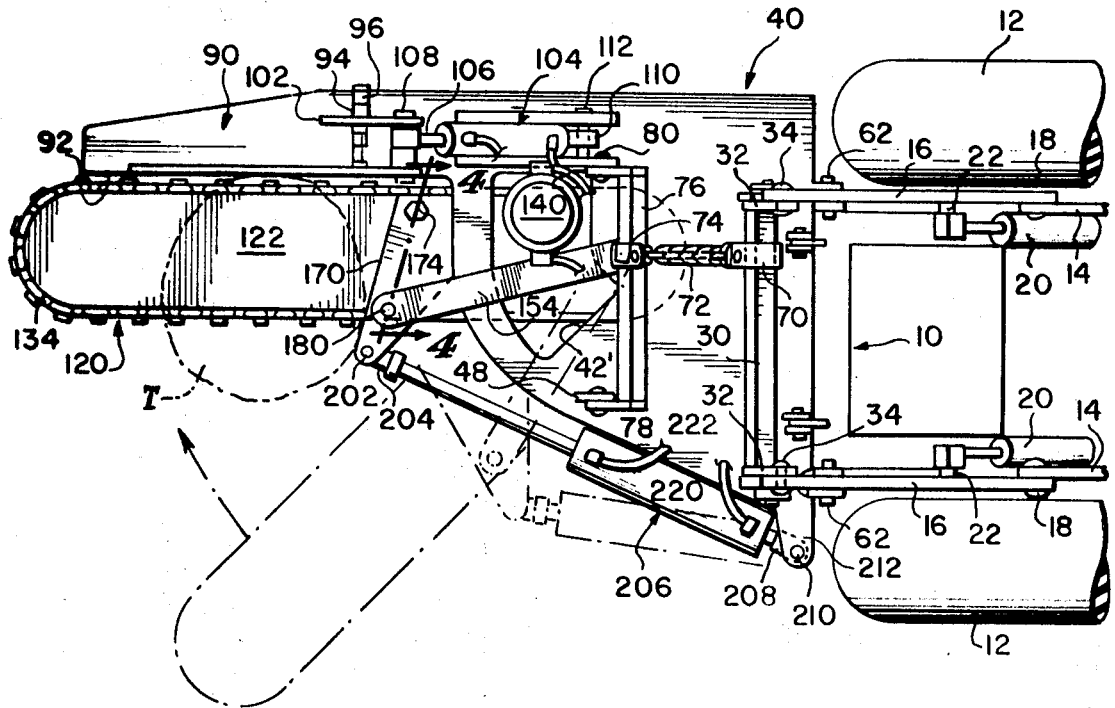
FIG. 1 is a top view of tree-felling apparatus according to the present invention, illustrating it mounted in operative position at the forward end of a tractor, skidder, or similar vehicle.

Referring now to the drawings, wherein like reference characters designate corresponding parts throughout the several views, as seen in FIG. 1, a tractor or skidder or similar vehicle is provided with a forwardly extending framework 10 and a pair of front wheels 12. A pair of frame members 14 are secured to opposite sides of the tractor and have arms 16 pivotally interconnected therewith for pivotal movement about pivot pins 18. Hydraulic operating rams 20 are pivotally interconnected with the tractor and the piston rods of the rams are pivotally connected at the outer ends thereof with pivot pins 22 secured to the arms 16 whereby operation of the rams 20 causes pivotal movement of arms 16 through a vertical arc about the axes of pivot pins 18.

A cross bar 30 has arms 32 rigidly attached to the opposite ends thereof, these arms being pivotally interconnected with the outer ends of arms 16 by pivot pins 34.

Figure 3:
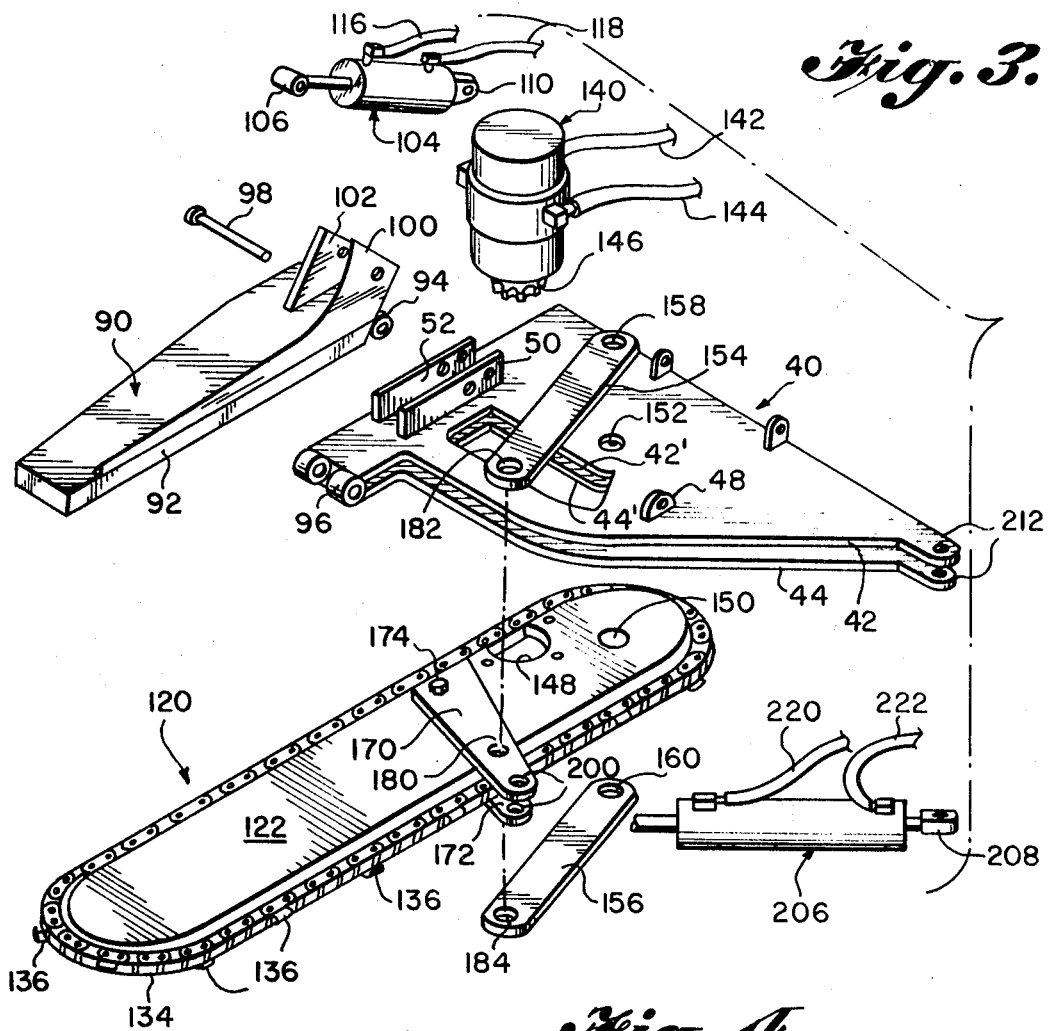
FIG. 3 is a top perspective exploded view of the tree-felling apparatus.

As seen most clearly in FIG. 3, a support means is indicated generally by reference numeral 40 and includes an upper plate 42 and a lower plate 44 of similar configuration, these plates being retained in spaced relationship to one another by suitable spacer members (not shown) rigidly affixed thereto. A pair of spaced apertured lugs 46 are secured to and extend upwardly from the framework 10. A further apertured lug 48 extends upwardly from top plate 42. A pair of spaced parallel apertured plates 50 and 52 are also secured to the top plate 42 and extend upwardly therefrom.

Referring again to FIGS. 1 and 2, a pair of links 60 are connected at the upper ends thereof by pivot pins 62 with ears 64 depending from the arms 16 previously described. A turnbuckle mechanism 66 is provided at a medial portion of each of links 60, and the lower ends of each of links 60 pivotally interconnected by a pivot pin 68 with one of the lugs 46 secured to the upper plate of the framework 10.

A clevis 70 is attached to crossbar 30 and is interconnected with the upper end of a flexible chain 72. The lower end of this chain is connected to a clevis 74 which is attached to a generally C-shaped yoke 76. The opposite legs of this yoke are pivotally attached by pivot pins 78 and 80 to lug 46 and plate 50, respectively. Chain 72 could be replaced with a double-acting hydraulic cylinder, much like cylinder 80 in U.S. Pat. No. 3,382,899.

Figure 2:
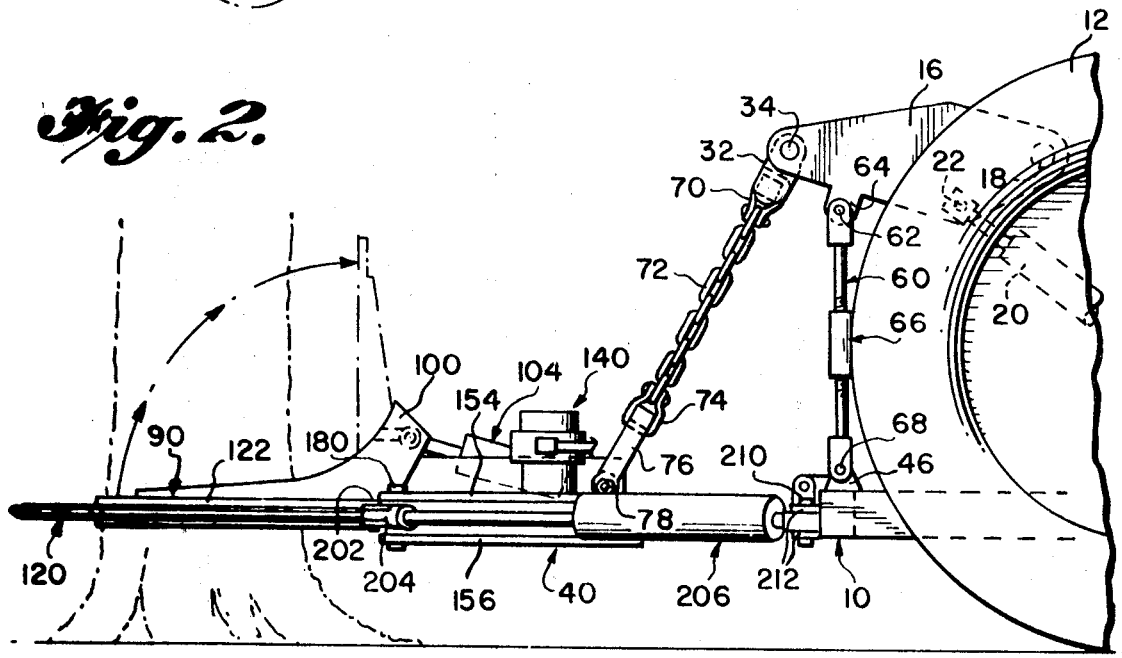
FIG. 2 is a side view of the apparatus shown in FIG. 1.

As seen most clearly in FIGS. 1 and 3, a jaw indicated generally by reference numeral 90 includes a flat side surface 92 adapted to engage a tree to be felled. Apertured member 94 secured to the jaw are adapted to be aligned with an intermeshing apertured portion 96 secured between plates 42 and 44 of the support means, member 94 and portion 96 having a bore formed therethrough for receiving a pivot pin 98 to thereby pivotally interconnect the jaw 90 to the support means 40 for pivotal movement of the jaw 90 about a substantially horizontal axis. The jaw 90 may be pivoted between the solid line position and the phantom line position as is illustrated in FIG. 2.

The jar includes a pair of rearwardly and upwardly extending apertured portions 100 and 102. A hydraulic operating ram 104 includes a piston rod having an apertured fitting 106 at the outer end thereof which is adapted to receive a pivot pin 108 extending through the apertured positions 100 and 102 of the jaw for pivotally interconnecting the piston rod of the hydraulic ram with the jaw.

The cylinder of the hydraulic ram has an apertured fitting 110 which receives a pivot pin 112 extending through the apertured plates 50 and 52 for pivotally interconnecting the hydraulic ram with the support means. A pair of hydraulic lines 116 and 118 are connected with opposite ends of the cylinder of the hydraulic ram for operating the ram. These hydraulic lines are connected with a suitable control means whereby the operation of the jaw may be remotely controlled from the associated vehicle.

Figure 5:
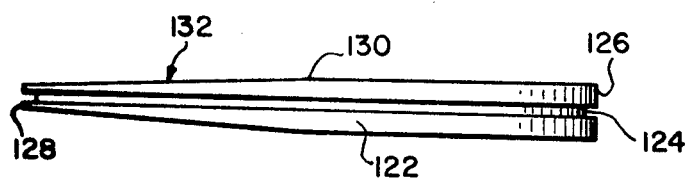
FIG. 5 is an end view of the saw bar of the chain saw means with the chain saw removed.

A chain saw means is indicated generally by reference numeral 120 and includes a saw bar 122 which, as seen most clearly in FIG. 5, includes a hardened chain groove 124 formed completely around the periphery thereof. The saw bar includes a trailing edge 126 and a leading edge 128. The saw bar tapers to a smaller dimension from a point 130 to the leading edge thereof to provide a tapered portion 132 for a purpose hereinafter described. A conventional chain 134 is mounted for movement within the chain groove, chain 134 having conventional cutting members 136 thereon.

The saw bar 122 carries the drive means for the chain saw in the form of a reversible hydraulic motor 140. A pair of hydraulic lines 142 and 144 are connected with a suitable source of fluid pressure which may be selectively controlled from a remote location for driving the chain saw in the desired direction at a selected speed. The hydraulic motor includes an output sprocket 146 adapted to mesh with the chain 134 for driving the chain in a well-known manner. This sprocket fits within a cutout portion 148 provided in the saw bar as seen in FIG. 3. Plates 42 and 44 of the support means are provided with similar shaped cutout portions 42' and 44' to provide clearance so that the motor 140 is adapted to move along with the chain saw as it pivots with respect to the support means as hereinafter described.

Figure 4:
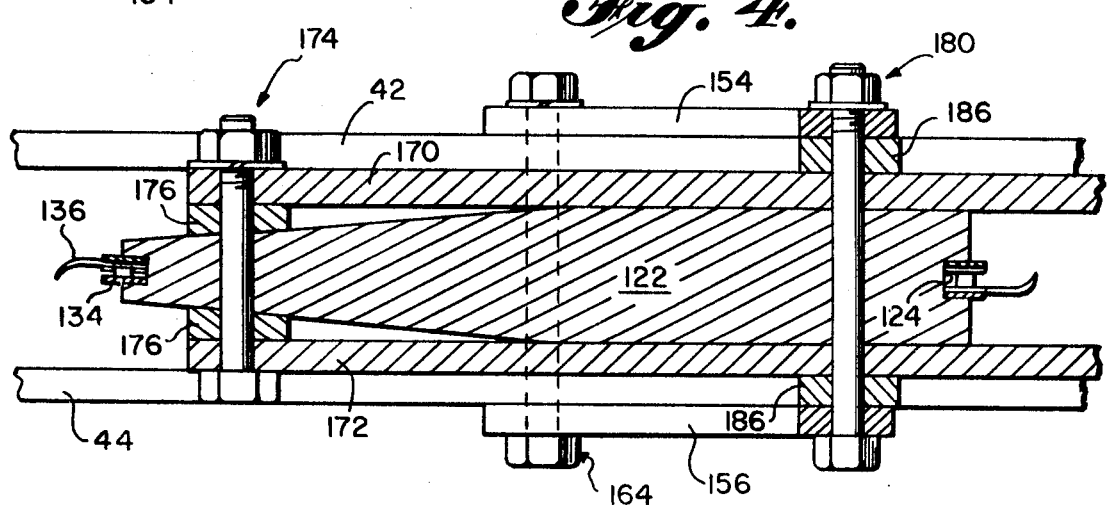
FIG. 4 is a fragmentary sectional view on an enlarged scale taken substantially along line 4—4 of FIG. 1 looking in the direction of the arrows.

As seen in FIG. 3, the saw bar is provided with a hole 150 formed therethrough which is adapted to be aligned with similar holes 152 formed through plates 42 and 44. A pair of links 154 and 156 have holes 158 and 160 which are also adapted to be aligned with holes 150 and 152 whereby a pivot pin 164, as seen in FIG. 4, is inserted through these aligned holes to mount the chain saw as well as the links 154 for pivotal movement with respect to the support means.

It will be noted that the chain saw means extends substantially parallel with and between the plates 42 and 44 and is mounted for swinging movement through an arc with respect to the support means.

A pair of arms 170 and 172 are secured to opposite sides of the saw bar of the chain saw. A first nut and bolt assembly 174 extends through suitable apertures provided in the saw bar, arms 170 and 172, and spacer members 176 as seen in FIG. 4.

Arms 170, 172 are also secured to the saw bar by a nut and bolt assembly 180 extending through suitable apertures in these members, the bolts of this nut and bolt assembly also extending through holes 182 and 184 in the outer ends of links 154 and 156, respectively, whereby the outer ends of these links are pivotally interconnected with arms 170 and 172 to assist in guiding movement of the chain saw means and rigidifying the overall arrangement.

As seen in FIG. 3, holes 200 are provided in the outer ends of arms 170 and 172 secured to the chain saw means. As seen in FIGS. 1 and 2, a pivot pin 202 extends through holes 200 as well as a suitable hole provided in a fitting 204 secured to the piston rod of a hydraulic operating ram 206. The cylinder of this hydraulic ram is secured to a fitting 208 which is pivotally connected by a pivot pin 210 with ears 212 extending from plates 42 and 44 of the support means.

A pair of hydraulic lines 220 and 222 are connected with opposite ends of the cylinder of hydraulic operating ram 206 for selectively actuating the ram to control swinging movement of the chain saw means through a limited arc toward and away from jaw 90.

In operation, the vehicle can be suitably maneuvered with the jaw means 90 either in vertical or horizontal position as may be more convenient and so located relative to a tree T as seen in FIG. 1 that the jaw means 90 when in its lowered horizontal position is adapted to engage one side of the tree.

The chain saw means may be initially spaced away from the jaw means as shown in phantom line position in FIG. 1 whereupon hydraulic drive motor 140 is actuated for operating the chain saw. Hydraulic operating ram 206 is then operated so as to swing the chain saw toward the jaw means 90 and into operative engagement with the tree.

As the chain saw means advances into the tree, the directional felling means in the form of tapered saw bar 122 will ensure that the chain saw is not pinched by the weight of the tree. Additionally, the shape of the saw bar is such as to provide a wedging effect whereby a positive force is applied to the tree so as to urge it to fall in the direction of movement of the chain saw means.

It is apparent that the mounting means whereby the apparatus is mounted on a vehicle permits adjustment of the tree-felling apparatus to accommodate different terrain and working conditions.

In FIGS. 1 and 2 the exact manner in which the framework 10 is connected to the supporting means 40 is not shown in great detail, since the novelty of the present invention does not reside in this particular feature. However, it is contemplated that framework 10 and support means 40 may be interconnected in the manner shown in Meece U.S. Pat. No. 3,327,745.

Referring now to FIG. 6, which is an end view of another type of saw bar that is contemplated as being within the scope of the present invention, it will be noted that the leading edge 128' of the saw bar 122' is inclined in a continual gradual manner rearwardly to the trailing edge 126'. 132' indicates the gradual incline. 124' is the groove for the saw chain. The embodiment shown in FIG. 6 contrasts with that shown in FIG. 5 in that the incline from the leading edge to the trailing edge in FIG. 5 is not continuous but is broken at point 130.

FIG. 7 shows still another embodiment of the invention wherein the saw bar 122" is not inclined from the leading edge 128" to the trailing edge 126". However, immediately to the rear of the trailing edge 126" is provided a "following" wedge member 320. This following wedge member may be at a fixed position with respect to the saw bar 122", so that they both move together in and out of the tree. Alternatively, the following wedge member 320 may be independently actuated (as for example by its own hydraulic cylinder) and thus can be inserted and withdrawn from a tree cut independently of the chain saw bar 122".

FIG. 8 shows still another embodiment and is an end view of another type of saw bar that is contemplated as being within the scope of the present invention. In this figure the saw bar 122a has a leading edge 128a and a trailing edge 126a. It also has a trackway 124a. Above and below the saw bar 122a are positioned wedge members 131a and 131b, which are spaced therefrom by spacers 128a and 129b.

FIG. 9 shows still another embodiment of the invention and in particular shows an end view of a saw bar 122b having a leading edge 128b, a trailing edge 126b and a trackway 124b. The trailing edge 126b is shown as being partially covered by a following wedge-shaped member 322 having a recess 324 therein into which the trailing edge can be received. In this embodiment the wedge-shaped member 322 not only serves to function in the same way as the previously described wedge-shaped members, but in addition serves to protect the trailing edge of the saw bar member 122b (for instance against falling logs).

FIG. 10 is a top plan schematic view of still another embodiment of this invention and it is seen in this view that the tree-cutting device involves two chain saw devices 305 and 306. The chains are driven by motors 309 and 310 respectively (preferably hydraulic motors). Each of the chain saws is pivotally mounted on a main support member 304 by pivot members 311 and 312. Two-way pistons 307 and 308 interconnect the support member 304 with an intermediate portion of each chain saw and move the chain saws through lateral arcs. Hinge members 301, 302, and 303 permit pivotal attachment of the support member 304 to a tractor, skidder, or the like.

A preferred method for operating with the arrangement shown in FIG. 10 is to first move chain saw 306 toward the tree T so that the chain saw will make a cut therein (e.g. a five inch cut). After chain saw 306 has made this cut, it is withdrawn from the tree and then chain saw 305 is moved towards the tree T and it is urged toward said tree until it is felled. When preceding in this manner the tree will be directionally felled in accordance with the cut initially made by chain saw 306.

In FIG. 10, it is preferable that at least one of the chain saw members 305 and 306 is contoured in the manner illustrated in FIGS. 5, 6, 8 and 9. However, since chain saw 306 is primarily for the purpose of providing a cut that will govern the direction of felling, it need not be contoured in the manner shown in FIGS. 5, 6, 8 and 9.

According to a still further embodiment of the invention in a modified form of the arrangement shown in FIG. 10, the chain saw 306 is movable in and out of a jaw means. The jaw means and the chain saw are mounted so that after the tree is felled, if it should thump down on the jaw with the chain contained in it, the jaw can move downwardly below the level of the cut stump by virtue of the fact that the jaw is hingedly mounted to a supporting framework 304. Preferably the jaw is spring loaded with relation to supporting member 304.

More specifically, and by way of example, the chain saw 306 could be smaller (perhaps one-half the size) than the chain saw 305. It could be mounted within a protective jaw member that was connected to the support member 304 by some sort of a hinged connection. This hinged jaw would include a small hydraulic cylinder to move the chain saw in and out of the protective jaw, and toward and away from a tree. As soon as the chain saw had made its cut into one side of the tree for the desired distance (e.g. one-tenth to one-third the diameter of the tree) the chain saw could be retracted into the protective jaw by means of the small hydraulic cylinder. Thereafter the other larger chain saw (such as 305) would be activated to make a complete cutting of the tree starting from the opposite side of the tree. With this arrangement then, at the instant that the tree begins to topple over, the main chain saw 305 would be resting on the top of the cut stump, while the smaller chain saw (sheathed within the protective jaw) would be disposed in about the position shown in FIG. 10 for the chain saw 306. If the jaw in which the small chain saw is contained is hingedly mounted to the supporting framework 304 (for instance by some sort of a spring loading) so that it can move from an essentially horizontal position downwardly through a limited arc, then if the cut end of the toppling tree should thump down upon such a jaw, no great twisting stress would be placed upon the jaw and its contained blade. Instead the jaw would simply "give way" downwardly in a resilient fashion. If the jaw was not hingedly mounted in this manner, even occasional poundings from fallen trees could be extremely severe, and unless the entire structure was built in an extremely sturdy manner, the unit would soon be torn apart.

In a further modification of my invention, and in particular in a further modified version of an arrangement shown in FIG. 10, the chain saw 305 is "followed" by a wedging member, such as "following" wedge member of the type shown as 320 in FIG. 7, or 322 in FIG. 9. Such a wedge member would preferably be placed laterally behind the chain saw 305 and independently pivoted from the support 304. By "independently pivoted" is meant that the saw 305 and the following wedge member could have either a common pivot point or separate pivot points, but the means for moving the saw and the wedge through lateral arcs would be independent so that the saw and the wedge could either be moved in unison or independently, or for a time in unison and for a time independently.

In a preferred way of operating, after the tree-cutting device was in position with respect to a tree and after the saw 306 has made its directional felling cut, it would withdraw from the tree and then saw 305 and its "following" wedge would move in unison toward the tree. As the saw 305 cut into the tree the following wedge would follow immediately behind the trailing edge of the saw. When the trailing edge of the saw also got within the tree, the following wedge would attempt to follow. Depending upon the size of the tree, it might be difficult for the wedge to follow very far into the tree. However, the following wedge would exert pressure at the mouth of the cut and would continue to do so as the chain progressed on ahead of it in cutting through the tree. Finally, when the tree is cut to such an extent that it is possible for the following wedge to enter the cut and assist in toppling the tree. The following wedge also serves to keep the cut portion open so that the tree will not exert a pinching force on the saw bar or the saw chain. The shape of the following bar may be varied a great deal and the pressure behind it can vary from a few hundred to a few thousand pounds. By appropriate arrangement of the hydraulic circuiting, the pressure behind the wedge may be varied in accordance with the progress of the chain saw.

The primary function of saw 306 (either protected by a sheathing jaw or not) is to provide an "undercut" so as to facilitate directional felling of the tree. This undercut can be from 1 to 6 inches below the level of the cut made by chain saw 305. Furthermore, in a further modified version of the arrangement shown in FIG. 10 the chain saw 305 is "followed" by an elongated wedging member, such as that shown at 320 in FIG. 7 and 322 in FIG. 9. Such a following member is independently actuatable with respect to the chain saw 305.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A tree-felling apparatus comprising in combination:
   a. an endless saw chain,
   b. a saw bar member disposed within the periphery of said endless chain and functioning as the main supporting member for said chain, c. a trackway for said endless saw chain disposed around the periphery of said saw bar member,
d. means for intermittently driving said chain around said trackway,
e. said saw bar member being pivotally mounted upon a support member that is in turn adapted to be pivotally connected to a wheeled vehicle so that the support member can be pivoted through a vertical arc and about a horizontal axis,
f. said support member including a jaw member,
g. means for moving said saw bar member through a limited arc about its pivotal mounting so that said saw bar member can move toward and away from said jaw member,
h. said saw bar member having a leading edge and a trailing edge, the leading edge being disposed immediately behind the portion of the saw chain that is closest to said jaw member and the trailing edge being disposed directly rearwardly of said leading edge,
e. the cross-sectional configuration of said saw bar member and any parts joined thereto in the area between said leading edge and said trailing edge being at least partially wedge-shaped,
j. whereby, as said saw chain cuts into the trunk of a tree, and the saw bar member follows into the cut so made, the wedge-shaped cross-sectional configuration of said saw bar member will assist in the directional felling of the tree.